United States Patent [19]

Kiemer

[11] 4,274,821
[45] Jun. 23, 1981

[54] DIE FOR EXTRUDING REINFORCED FABRIC

[75] Inventor: Ralph F. Kiemer, Akron, Ohio

[73] Assignee: The Steelastic Company, Akron, Ohio

[21] Appl. No.: 125,667

[22] Filed: Feb. 28, 1980

[51] Int. Cl.³ .......................... B21C 3/02; B29F 3/10
[52] U.S. Cl. ............................... 425/114; 264/172; 425/113
[58] Field of Search .............. 425/113, 114; 264/172, 264/174

[56] References Cited

U.S. PATENT DOCUMENTS

| | | | |
|---|---|---|---|
| 2,979,431 | 4/1961 | Perrault | 425/113 |
| 3,616,496 | 11/1971 | Angioletti et al. | 425/113 |
| 3,697,209 | 10/1972 | Schiesser | 425/114 |
| 3,758,247 | 9/1973 | Deegan | 425/114 |
| 3,803,695 | 4/1974 | Tucci | 29/749 |
| 4,150,929 | 4/1979 | Brandt | 425/114 |

Primary Examiner—Donald E. Czaja
Assistant Examiner—W. Thompson
Attorney, Agent, or Firm—Hamilton, Renner & Kenner

[57] ABSTRACT

A die (12) for extruding an elastomeric ribbon (14) reinforced with laterally spaced longitudinal filaments (13), said die having mating die blocks (17 and 18) enclosing mating die plates (15 and 16) embracing a filament guide insert (25), and said insert being undercut at (38) to form a flat surface (39) having exposed grooves (42) which are extensions of the filament guide passageways (26), whereby the exiting portions of the filaments (13) are partially encapsulated with elastomeric material while in said grooves (42).

8 Claims, 8 Drawing Figures

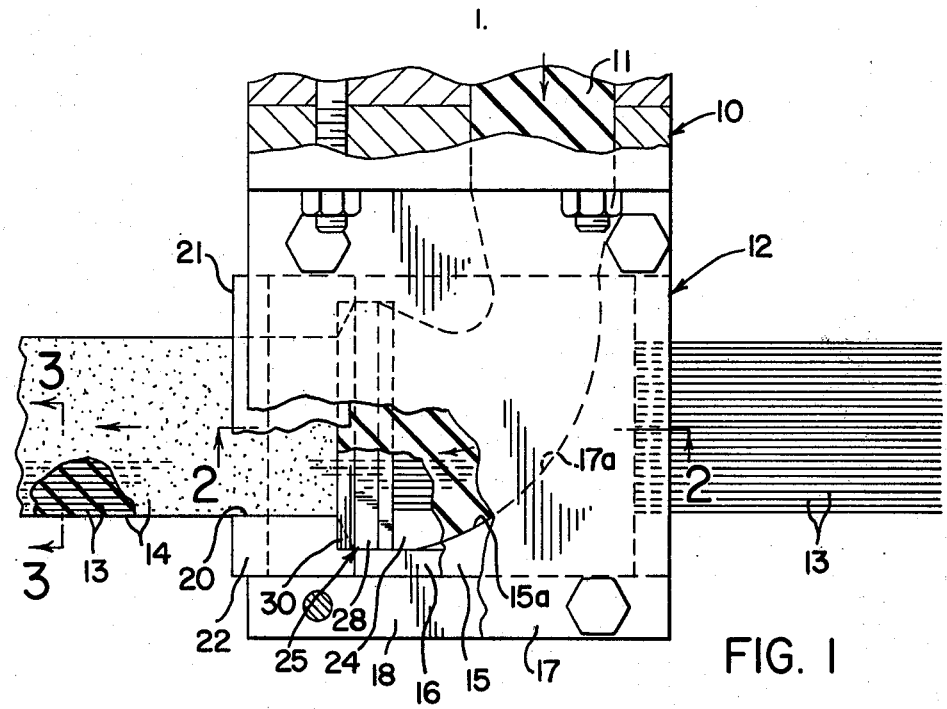
FIG. 1
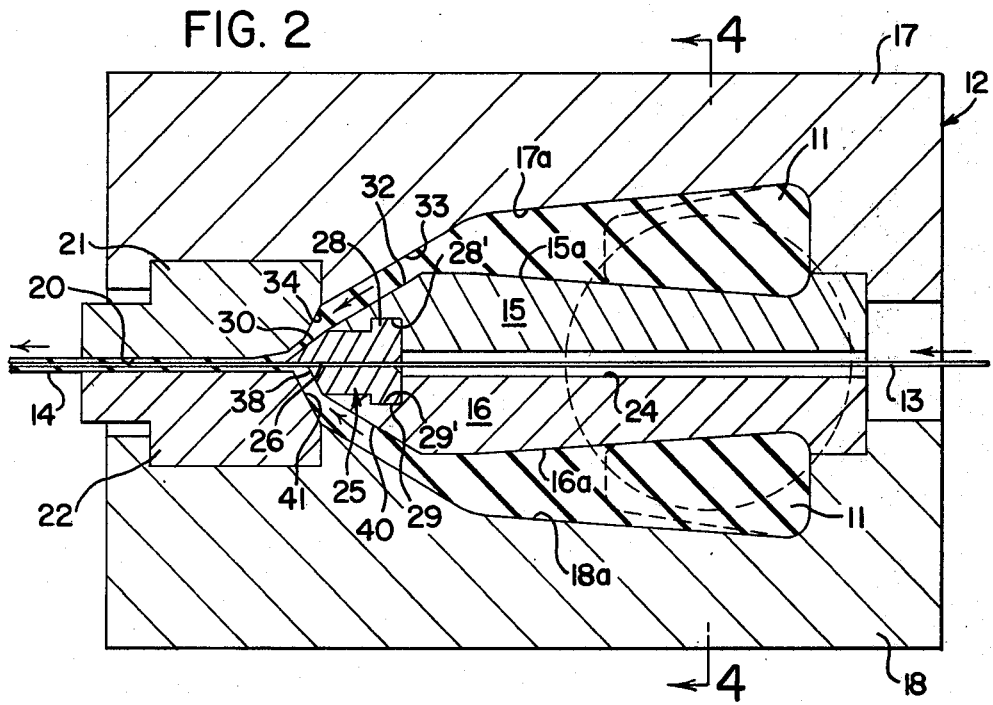
FIG. 2
FIG. 3

DIE FOR EXTRUDING REINFORCED FABRIC

TECHNICAL FIELD

The invention relates to the manufacture of an elastomeric ribbon such as a tire ply which is reinforced with laterally spaced cords or wires. The wires are encapsulated within a ribbon of uncured elastomeric material which is extruded around and encapsulates the spaced wires as they move continuously in a longitudinal direction.

BACKGROUND ART

An apparatus for making a reinforced fabric ribbon such as a tire ply is disclosed in prior U.S. Pat. No. 3,803,965. As shown in FIGS. 3-9 of that patent, a number of laterally spaced reinforcing wires are moved through a crosshead extrusion die having grooved matching die plates for guiding the wires accurately in uniformly spaced relation. The extrusion die is provided with passageways for flowing the elastomeric material under pressure around and encapsulating the wires as they emerge from the guide grooves, thus producing the reinforced ribbon of uncured fabric. The ribbon is then severed into lengths which may be oriented at a preselected bias and stitched edge to edge to produce a belt of fabric with the reinforcing wires at the preselected bias to the length of the belt.

It is very important that the uniform lateral spacing of the wires or filaments in the extruded reinforced ribbon be accurately maintained, because during the manufacture of a tire utilizing increments of such ribbon as a ply or plies therof the fabric is expanded laterally of the filaments to almost twice its original width, with the result that if the spacing is uneven, the wider spaces become weakened areas.

It has been found in practice in using extruding dies such as shown in said U.S. Pat. No. 3,803,965, wherein the elastomeric material is flowed under pressure across the top and bottom of the wires as they emerge from the guide grooves, that the resulting ribbon is often weakened, apparently because the uniform spacing between the wires is not maintained. On expansion during tire building, the wider spaces produce weak spots or areas and in some cases the adhesion between the elastomeric material and the contiguous wires is materially reduced.

A number of variations have been proposed in the design of the extrusion die and of the throat wherein the elastomeric material is flowed around the wires emerging from the guide grooves, but in all cases of which I am aware, the difficulties causing weakened areas in the extruded reinforced ribbon have not been overcome.

DISCLOSURE OF INVENTION

The present invention provides an improved die for extruding a reinforced elastomeric ribbon which overcomes the difficulties experienced with prior extruded reinforced ribbons.

An object of the present invention is to provide an improved die for extruding an elastomeric ribbon having laterally spaced reinforcing filaments encapsulated therein.

Another object is to provide an improved extrusion die insert which maintains uniform lateral spacing of the reinforcing filaments as they become encapsulated in the elastomeric material.

A further object is to provide an improved extrusion die which produces a reinforced elastomeric ribbon capable of expansion during curing to almost twice its width without causing weakened areas therein.

A still further object is to provide an improved extrusion die insert construction which can be easily modified to produce a reinforced elastomeric ribbon in which the location of the uniformly spaced filaments is varied relative to the top and bottom surfaces of the ribbon.

These and other objects are accomplished by the improvements comprising the present invention, a preferred embodiment of which is disclosed herein by way of example as comprising the best known mode of carrying out the invention. Various modifications and changes in details of construction are comprehended within the scope of the appended claims.

BRIEF DESCRIPTION OF DRAWINGS

FIG. 1 is a plan view, partly broken away and in section, of a crosshead extruder enclosing die plates embodying the improved wire guide insert of the present invention, and showing schematically the reinforcing filaments passing into the die and emerging encapsulated in the elastomeric ribbon.

FIG. 2 is an enlarged sectional view on line 2—2 of FIG. 1.

FIG. 3 is an enlarged perspective view of a section of the extruded elastomeric ribbon with the wires or filaments encapsulated therein.

PREFERRED EMBODIMENT OF THE INVENTION

Referring to FIG. 1, an extruder is indicated generally at 10, and elastomeric material 11 is extruded into the crosshead die 12. Reinforcing filaments indicated at 13, which may be metal wire, enter the die and are encapsulated within a ribbon of the elastomeric material shown at 14 emerging from the opposite side of the die 12.

Figure 8:
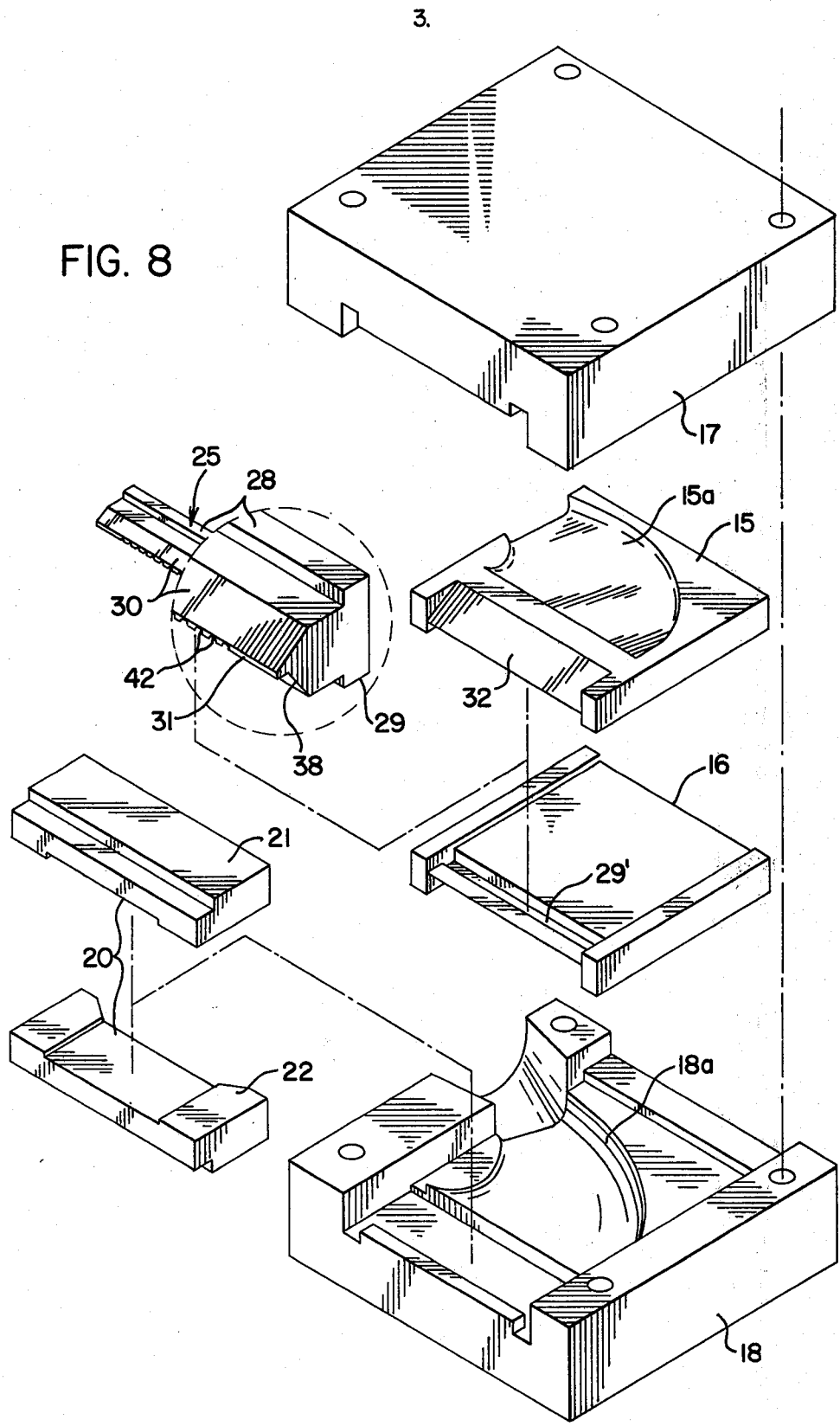
FIG. 8 is an exploded perspective view of the extruder crosshead and the die plates and wire guide insert therein.

Mating die plates 15 and 16 (FIG. 8) are embraced within upper and lower die blocks 17 and 18, respectively, and the opposed surfaces of the die plates and die blocks are provided with complementary curved recesses indicated at 15a and 17a and 16a and 18a, respectively, forming passageways to deliver a constant flow of elastomeric material 11 into and through the throat of the die leading to the discharge slot 20, formed between insert bars 21 and 22 embraced between die blocks 17 and 18 at the discharge side thereof. The design and contour of the curved recesses 15a, 16a, 17a and 18a per se forms no part of the present invention.

A lateral slot 24 is formed between the die plates 15 and 16 and the filaments or wires 13 are moved in the direction of the arrow in FIG. 2 into and through the slot in laterally spaced relation. At the front end of the slot a wire guide insert bar 25 is embraced between the die plates 15 and 16 and is provided with laterally uniformly spaced longitudinally directed co-planar cylindrical guide passageways 26 in alignment with the lateral slot 24 and with the discharge slot 20 between bars 21 and 22. Preferably, the passageways 26 are chamfered at their inner ends. Thus, the individual wires or filaments 13 pass from slot 24 into and through the individual guide passageways 26 which maintain the wires in uniform laterally spaced relation.

The wire guide bar 25 preferably has vertically projecting ribs 28 and 29 extending laterally along its rear edges and these ribs fit in laterally extending grooves 28' and 29' in the die plates 15 and 16. The upper front surface 30 of guide bar 25 is preferably inclined downwardly and intersects the front ends of the guide passageways 26 at the nib edge 31 of bar 25 which is at the entrance end of the discharge slot 20. The front surface 32 of die plate 15 is inclined downwardly at substantially the same angle and merges into the surface 30.

Adjacent to and spaced above the surface 32 is an inclined surface 33 on die block 17 which is inclined downwardly substantially parallel to surface 32, and the surface 33 intersects a more steeply inclined surface 34 on the inner end of bar 21, which in turn intersects a less inclined surface 35 on bar 21 which is parallel with surface 30, thus forming a constricted throat between the two surfaces. If desired, the surface 35 may intersect another lesser inclined surface 36 on bar 21 at the entrance to the slot 20.

Figure 4:
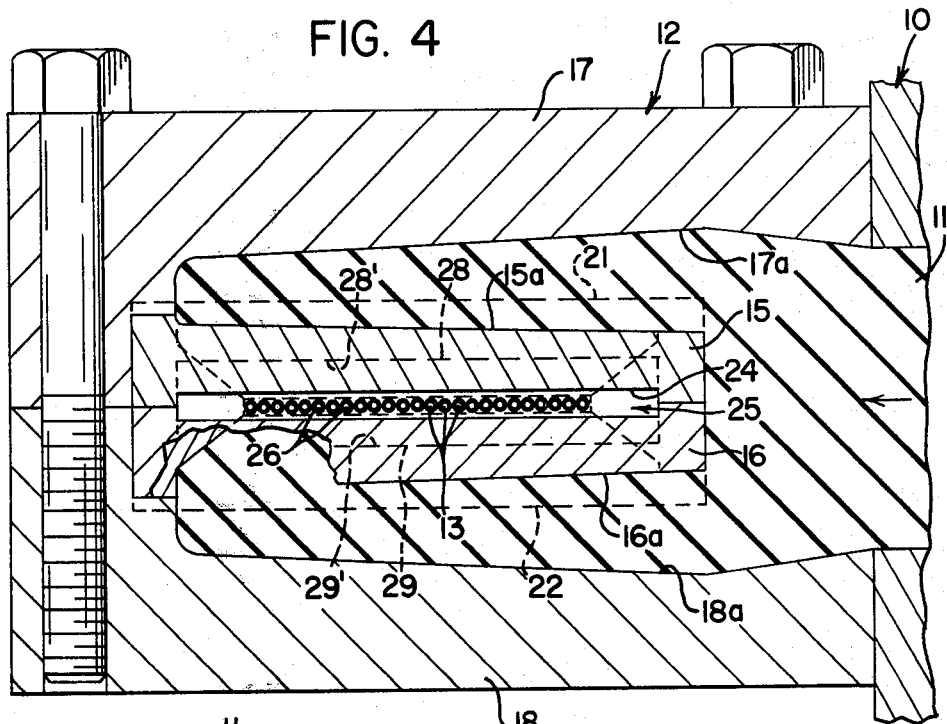
FIG. 4 is a sectional view on line 4—4 of FIG. 2.
Figures 5, 6:
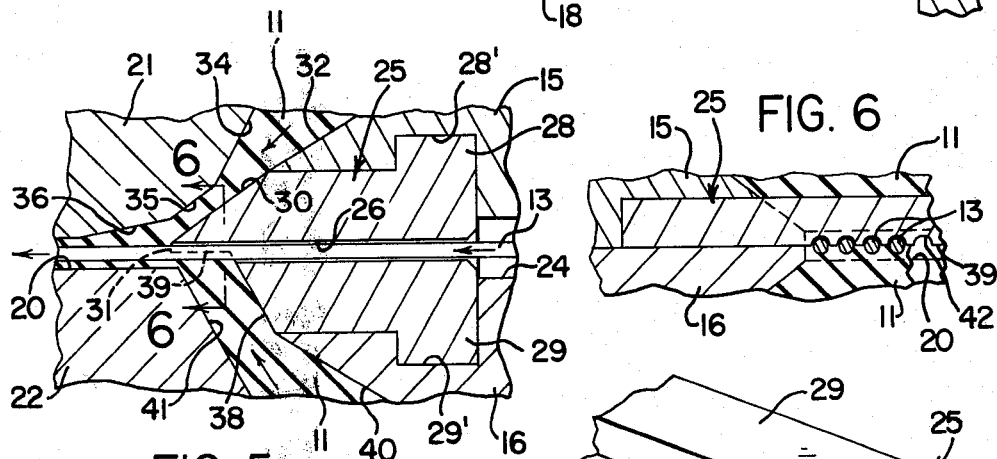
FIG. 5 is a further enlarged partial sectional view of the improved wire guide insert and the surrounding throat of the extruder die.
FIG. 6 is a partial sectional view on line 6—6 of FIG. 5.
Figure 7:
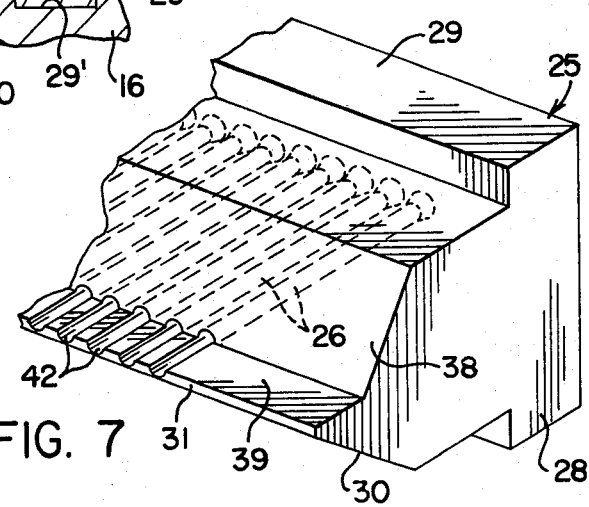
FIG. 7 is an enlarged perspective view of the improved wire guide insert in inverted position.

As best shown in FIGS. 5 and 7, the nib 31 of the insert bar is undercut to form an upwardly inclined surface 38 intersecting a horizontal surface 39 in the plane of the axes of the guide passageways 26. Preferably, the surface 38 is inclined at a steeper angle than the upper surface 30 and surface 38 intersects a surface 40 on plate 16 inclined to the horizontal at the same angle as surface 32 on upper die plate 15. An inclined surface 41 on the inner end of bar 22 is preferably parallel with surface 38 and forms a constricted throat between the two surfaces terminating at the horizontal surface 39. Preferably, the distance between the surfaces 38 and 41 is substantially equal to the width of surface 39.

The horizontal undersurface 39 is provided with longitudinal semi-cylindrical grooves 42 which are extensions of the lower halves of the cylindrical passageways 26 and act as guides for the moving wires 13 from the intersection of surfaces 38 and 39 out to the nib end 31 of surface 30.

In the operation of the improved extruding die, assuming that the elastomeric material 11 is flowing under pressure through the extruded head and between the constricted surfaces of the throat into the discharge slot 20, as the wires 13 emerge from the guide passageways 26 of the insert 25 and pass through the semi-cylindrical grooves 42 the material flowing upwardly between inclined surfaces 38 and 41 will contact and encapsulate the exposed semi-cylindrical portions of those portions within the grooves 42. At the same time the upward pressure exerted by the material will maintain the wires in the grooves. Accordingly, when the wires emerge from the outer ends of the grooves the encapsulating material maintains the wires in uniform laterally spaced relation while their upper semi-cylindrical portions are being encapsulated by the material from above.

As the encapsulated wires proceed through the discharge slot 20, the increased height of the slot 20 relative to the diameter of the wires determines the amount of elastomeric material above and below the wires. As shown, the wires are located medially of the top and bottom surfaces of the slot, but if it is desired to have them slightly off center, this can be accomplished by using a die insert 25 in which the horizontal axes of the wires are correspondingly offset vertically of the slot 20.

It has been determined in actual practice that reinforced elastomeric fabric extruded from the improved die of the present invention, when expanded laterally to almost twice its extruded width, does not develop weak spots and the uniform lateral spacing of the reinforcing wires is maintained.

I claim:

1. A die for extruding an elastomeric ribbon reinforced with laterally spaced longitudinal filaments, said die enclosing a guide insert having uniformly laterally spaced co-planar filament guide passageways therethrough, said insert being undercut on one side at its discharge end to form exposed groove extensions of said guide passageways, and said die having passageways forming a constricted throat around the discharge end of said insert for extruding elastomeric material around filaments emerging therefrom, whereby the exiting portions of said filaments are partially encapsulated before they leave the groove extensions.

2. A die as described in claim 1, wherein said filament guide passageways are cylindrical and said groove extensions are semi-cylindrical.

3. A die as described in claim 1, wherein the guide insert is held between the discharge ends of mating die plates enclosed within the die.

4. A die as described in claim 3, wherein said undercut discharge end of said insert forms a flat surface in the plane of the axes of the guide passageways, and said groove extensions are formed in said flat surface.

5. A die, as described in claim 1, wherein the discharge end of said insert has converging inclined surfaces forming a nib, one of said inclined surfaces being undercut relative to the other to form the exposed groove extensions.

6. A die as described in claim 5, wherein the guide insert is held between the discharge ends of mating die plates enclosed within the die.

7. A die as described in claim 6, wherein said filament guide passageways are cylindrical and said groove extensions are semi-cylindrical.

8. A die as described in claim 7, wherein said undercut discharge end of said insert forms a flat surface in the plane of the axes of the guide passageways, and said groove extensions are formed in said flat surface.

* * * * *